United States Patent [19]
Omessi

[11] Patent Number: 5,573,803
[45] Date of Patent: Nov. 12, 1996

[54] VEGETABLE PEELER

[76] Inventor: Benjamin Omessi, 11710 Doral Ave., Northridge, Calif. 91326

[21] Appl. No.: 254,695

[22] Filed: Jun. 6, 1994

[51] Int. Cl.⁶ .............................. A23L 1/10; A23L 1/216; A23P 1/00
[52] U.S. Cl. ............................................ 426/483; 99/586
[58] Field of Search .......................... 99/584, 586, 540, 99/541, 585, 588, 605, 606, 607, 608; 426/478, 479, 481, 482, 483

[56] References Cited

U.S. PATENT DOCUMENTS

| | | | |
|---|---|---|---|
| 263,195 | 8/1882 | Morgan | 99/607 |
| 2,390,700 | 12/1945 | Fellner | 99/586 |
| 3,192,977 | 7/1965 | Bean | 99/586 |

Primary Examiner—David Scherbel
Assistant Examiner—Reginald L. Alexander
Attorney, Agent, or Firm—Walter Unterberg

[57] ABSTRACT

Disclosed are peelers for fruits and vegetables and the like food products. The peelers are preferably tubular in shape and formed from an extruded flexible homogeneous composition. The tubular shape and its flexibility enables the inside diameter food contacting surfaces to roll towards and away from one another while compressively engaging the food between the surfaces. Compressive rolling engagement of a food product between the food contacting surfaces results in peeling away of the food product outer layers.

6 Claims, 2 Drawing Sheets

VEGETABLE PEELER

BACKGROUND OF THE INVENTION

1. Field of the Invention

The present invention pertains to apparatus for removing the outer skin of a vegetable or other food product.

2. Description of the Related Art

Peeling devices for vegetables and fruit are well known, but require a considerable amount of manual dexterity which is often taken for granted and which might not be available to certain individuals who are recovering from an accident, or who suffer from permanent Disability. Vegetable and fruit peelers typically are made of metal and having a sharpened cutting edge formed in a body portion which limits the depth penetration of the sharpened edge into the food being prepared. Mechanized vegetable peelers are also known to include a sharpened edge, and have a gear system for rotating the apple with respect to the cutting edge. As indicated, these types of equipment may not be suitable for certain individuals lacking the requisite manual dexterity and accordingly, improvements in peeling equipment are still needed.

SUMMARY OF THE INVENTION

The present invention is directed to the peeling or removal of the outer skin of food products such as garlic or small onions.

It is the object of the present invention to provide peelers for food of the above described type, which require minimal manual dexterity for their operation.

Yet another object of the present invention is to provide peelers formed from a minimal number of parts and which is not subject to corrosion encountered with metal peeling implements.

These and other objects according to the present invention which will become apparent from studying the appended description and drawings are provided in a food peeler for peeling food having an outer skin, comprising a body formed from a single flexible tubular extrusion, comprising:

a major food contacting inside surface for frictionally engaging the food outer skin;

a flexible and bendable material for positioning and compressing the food therebetween and for compressively engaging the food against the inside food contacting surfaces of the apparatus;

a tubular shape which will enable the inside diameter food contacting surfaces to roll, continuously towards and away from one another while compressively engaging the food between the surfaces.

DETAILED DESCRIPTION OF THE PREFERRED EMBODIMENTS

Figure 1:
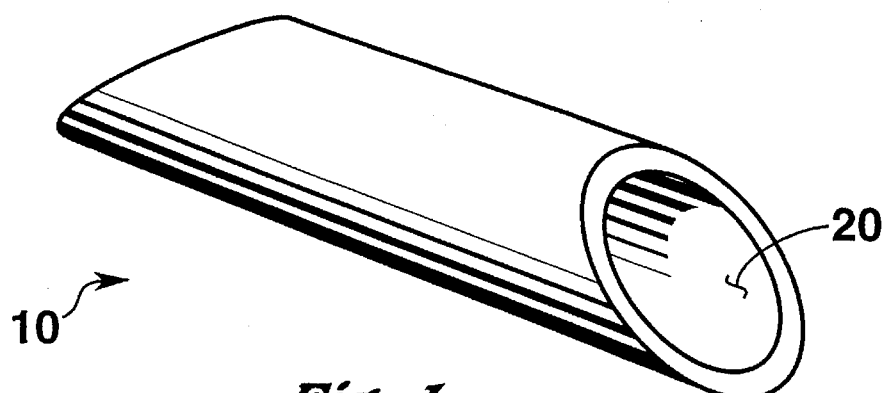
FIG. 1 is a perspective view of a peeler according to principles of the present invention.
Figure 2:
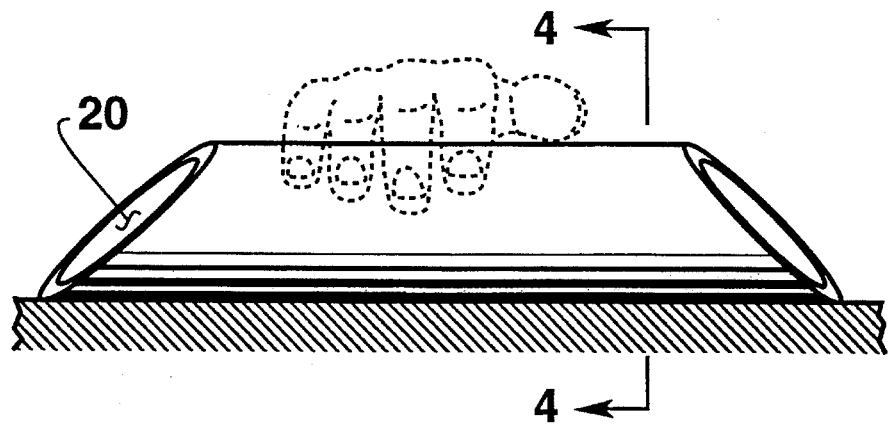
FIG. 2 is a side elevation view.

Referring now to the drawings and initially to FIGS. 1–7, a peeler according to the present invention is generally indicated at 10. Peeler 10 is preferably of unitary construction and is tubular in configuration. The material of the invention is flexible and is chosen so that it will successfully withstand repeated bending and torsion forces resulting from the movements illustrated in FIGS. 4 and 5. Most preferably, the material of peeler 10 is homogeneous throughout and may comprise a rubber or vinyl rubber such as SANTOPRENE. However, the body may be also made of other flexible material, and the inside food contacting surface 20 may be coated or laminated with a suitable friction material.

Figure 5:
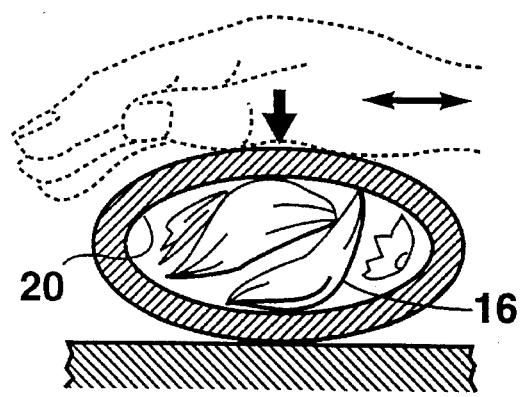
FIG. 5 is a cross-section, taken along the line 5—5 of FIG. 3 showing the compressing and rolling motion of the food contacting surface of the apparatus against the food product.
Figure 7:
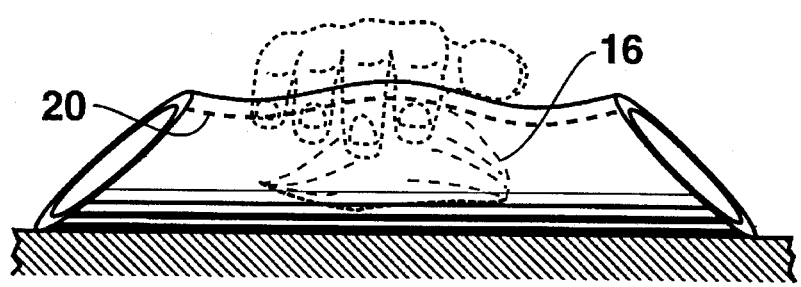
FIG. 7 is an elevation showing cupping deformation of the apparatus and food contacting surfaces in contact with the food.

Opposed faces of the inside food contacting surface of peeler 10 are brought into contact with a food product, such as the garlic 16 as illustrated in FIGS. 5 & 7. As illustrated in FIG. 5 & 7, downward pressure is manually applied to the top of peeler 10.

It generally preferred that the material of peeler 10 be selected to withstand the cupping deformation illustrated in FIG. 7, presenting a concave friction surface 20 to one side of the food product, with the food product being pressed between the upper and lower friction surfaces. As shown, FIGS. 2, 4, 5, 6, & 7 peeling apparatus 10 may be laid on a flat surface, such as that of a table. However, the peeling apparatus has also been found to perform satisfactorily when laid in a person's lap or other irregular support surface.

Figure 3:
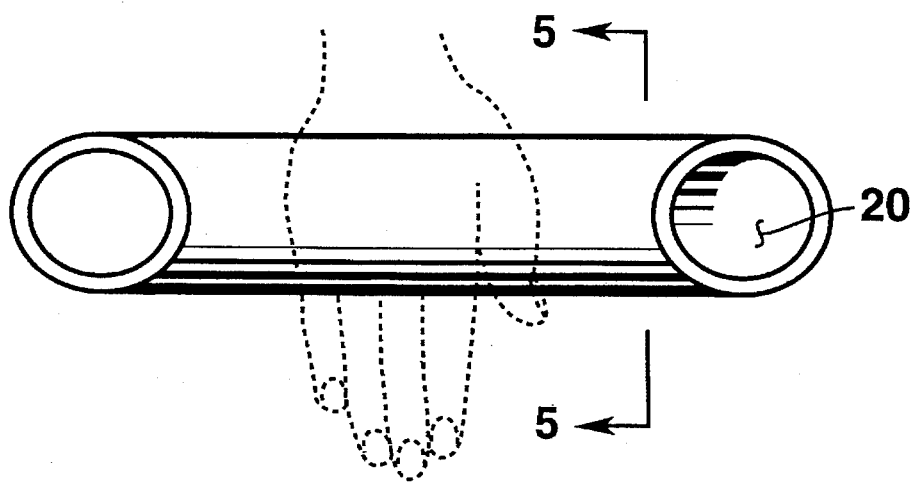
FIG. 3 is top plan view thereof.
Figure 4:
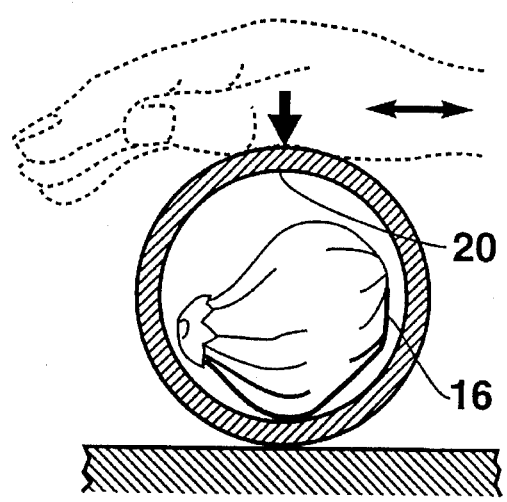
FIG. 4 is a cross-section, taken along the line 4—4 of FIG. 2.

As illustrated in FIG. 3, the operator's fingers need not apply pressure to produce the cupping deformation, and accordingly, the peeling apparatus is suitable for individuals lacking in manual dexterity and a limited range of motion. In fact, the fingers of a user's hand need not be employed at all, since, while the cupping deformation is preferred, it is not needed for satisfactory operation of the peeling apparatus. For example, the peeling apparatus may be inserted between two relatively flat surfaces as long as sufficient pressure is applied to the food being peeled.

As indicated in FIG. 5, repetitive back and forth rolling motion of the apparatus on a surface as pressure is applied to the food product 16 generates the requisite frictional rolling forces needed to impart a shear force to the outer skin of the food being peeled. It can now be seen that a minimal amount of manual dexterity is needed to perform peeling operation.

Referring to FIG. 3, the preferred embodiment is generally tubular in configuration. In the most preferred embodiment, the apparatus is elongated in the direction of the longitudinal axis, thus suggesting that a user's hand be oriented in the direction illustrated in FIGS. 2, 3, 4, 5 & 7. This description, however is directed only to the most preferred embodiment and the user's hand may be oriented in virtually any direction.

Figure 6:
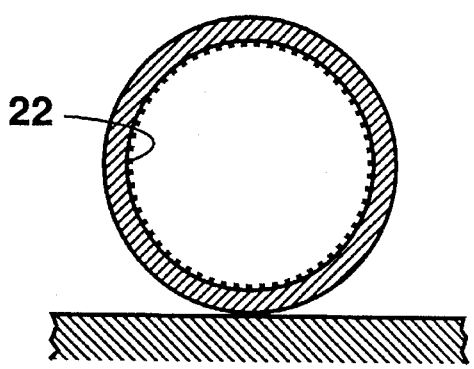
FIG. 6 is a cross-section illustrating raised rib food contacting surface.
Figure 8:
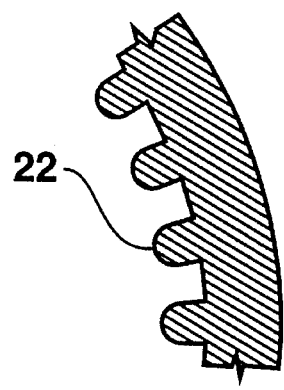
FIG. 8 is an enlarged section of FIG. 6 showing the raised rib portion.

While the above examples of operation have been described with reference to manual pressure being applied to the apparatus by the hands, it will now be appreciated by those in the Occupational Therapy art that a user's hands need not be employed at all, since with the requisite pressure and minimal range of motion required, the apparatus can easily be performed by a user's forearm elbow or upper arm for example. It has been found that with only modest pressure applied to the garlic, that the outer skin is quickly and easily removed with only a minimal amount of back and forth motion of the food product between the frictional surfaces. As mentioned above, it is important that the food contacting surfaces frictionally engage the food product to be peeled, and accordingly, it is generally preferred that the food contacting faces be sufficiently "soft" to provide the frictional engagement. However, the food contacting surfaces can be relatively "hard" and have low friction properties, such as disruptions in a smooth, blank from which the apparatus may be formed. An example of surface disruption is illustrated in FIG. 6. For example, the food contacting surface to the apparatus illustrated in FIGS. 6 & 8 has a raised surface texture 22. In the illustrated embodiment of FIG. 6 surface disruptions 22 preferably comprise raised rib portions, extending above the surface of inside face of the apparatus. If desired, the food contacting surface can be comprised of a coating applied to a substrate. While surface disruptions of generally elongated configurations are preferred, it will be appreciated that the present invention is also directed to surface disruptions of virtually any configuration, including sinuous wavy lines, cones, dimples and spaced circular portions if desired.

It will now be appreciated that the present invention allows peeling of certain food products by individuals who have heretofore been incapable of such food preparation. The peeling apparatus according to principles of the present invention requires only a minimal amount of physical dexterity and the pressure and rolling motion associated with the operation of the present invention need not be manually applied, but rather can be generated with minimal physical motion of another portion of the user's anatomy, since the preferred peeling motion requires only a slight pressure and a forward or sideways motion of the apparatus.

The drawings and foregoing descriptions are not intended to represent the only forms of the invention in regard to the details of construction and manner of operation. Changes in form and in the proportion, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed for:

1. A method for peeling food with an outer skin using a food peeler which comprises a tubular body with open ends made from a flexible material with an adhering inside surface, said method comprising the steps of:
   (a) inserting food to be peeled into the tubular body through the open ends;
   (b) compressing the tubular body to a deformed flattened shape against an external surface for the adhering inside surface to grip the outer skin of inserted food to be peeled;
   (c) rolling said compressed tubular body back and forth against the external surface until all outer skin has been peeled from inserted food; and
   (d) removing inserted food and peeled outer skin from the tubular body through the open ends.

2. The method of claim 1 wherein the flexible material is of generally homogeneous composition.

3. The method of claim 1 wherein the flexible material is rubber.

4. The method of claim 1 wherein the flexible material is a silicone compound.

5. The method of claim 1 wherein the flexible material is soft and highly compressible to provide said adhering inside surface.

6. The method of claim 1 wherein the flexible material is a plastic.

* * * * *